March 13, 1962     B. C. BIGOT     3,025,152

PROCESS FOR MANUFACTURE OF TRIPLE SUPERPHOSPHATE

Filed Aug. 22, 1956

INVENTOR.
Bernard Charles Bigot
BY
Bauer and Seymour
ATTORNEYS

United States Patent Office 3,025,152
Patented Mar. 13, 1962

3,025,152
PROCESS FOR MANUFACTURE OF TRIPLE SUPERPHOSPHATE
Bernard Charles Bigot, Grand-Quevilly, France, assignor to Compagnie de Saint-Gobain, Paris, France
Filed Aug. 22, 1956, Ser. No. 605,584
Claims priority, application France Sept. 2, 1955
5 Claims. (Cl. 71—41)

This invention relates to the preparation of triple super phosphate from phosphoric acid in the wet way.

Several processes of this type are known, and they are distinguished from each other by the technique used to eliminate the excess water which is found in the phosphoric acid. One of those processes uses a weak acid and eliminates excess water by drying. To that end, the sludge, which is very fluid, obtained by mixing the dilute acid with finely divided phosphate of fertilizer grade such as finely crushed phosphate rock, is added to a large quantity of the dried final product of the process, which is recycled so as to produce a divided product of sufficiently low humidity to enable the use of a rotary drier and hot gas for drying.

That process has two major objections: for each ton of new product, one recycles 15–20 tons of finished product, which requires a needlessly large and expensive apparatus; the phosphoric acid of 25–30% is a poor solvent for the $P_2O_5$ of the rock. The degree of solubilization hardly exceeds 50%. During the latter drying this degree increases to a value depending on the nature of the raw phosphate used, but remains limited by the necessity to quick dry, as the absence of water limits the reaction. With Moroccan phosphate, for example, this degree does not exceed 75–80%.

To improve this situation it has already been proposed to concentrate the phosphoric acid to 38–40% $P_2O_5$. This ameliorates the foregoing imperfections relating to the concentration of phosphoric acid without fully eliminating other imperfections. It is useful in making ordinary superphosphate and in that case gives an excellent yield of soluble $P_2O_5$ from the phosphate rock, but its advantage is overcome by the necessity of preliminarily concentrating the phosphoric acid from 25–30% at the filter to 50%. This presents grave difficulties from corrosion, encrustation and vesicular entrainment. Even the additional advantages, that the product solidifies itself and that the humidity is so low that it does not require subsequent drying, are not sufficient to make it wholly satisfactory.

It is an object of this invention to reduce the size of apparatus for making triple superphosphate, to eliminate preliminary concentration of phosphoric acid, to reduce the amount of final product that must be recycled, and to provide a smoother and better reaction.

The objects of the invention are accomplished generally speaking by utilizing dilute phosphoric acid, a satisfactory concentration of $P_2O_5$ being in the neighborhood of 25–30%, and dissolving therein a quantity of dried final product which is materially less than that which previously had to be recycled. In the preferred form of the invention, the final product is mixed with the dilute acid and the resulting sludge is then mixed with the phosphate rock. An additional advantage of the invention is that the rock can be used in lumps as it comes from the mine and need not be finely crushed, as was prior art practice. On the other hand, excellent results are also obtained if the final product, the dilute phosphoric acid, and the crude phosphate of fertilizer grade are mixed together. The final product is added in such quantity as to raise the $P_2O_5$ from the phosphatic raw material. This enables one to adopt the chemical condition existing in the second of the processes referred to but with the elimination of the difficulties arising from the necessity of concentrating the phosphoric acid.

The introduction of the recycled product can be made before or during the attack on the raw material. The process can be carried out continuously in one or several vats provided with agitators which are preferably of vertical type. The total volume of the vats should be sufficient to permit the total solution of the recycled product and a vigorous attack on the phosphatic raw material. According to the nature of the latter the sludge need remain in the reaction vats only about ½ hour to about 2 hours.

With this process it is possible to use North African phosphate as it is received from the mine without additional breakage, while attaining a degree of solubilization of 95% or better. This degree of solubilization is at least as high as in classic processes using concentrated acid and much higher than classic processes using dilute acid.

The above and further object and novel features of the present invention will more fully appear from the following detailed description when the same is read in connection with the accompanying drawings. It is to be expressly understood, however, that the drawings are for the purpose of illustration only and are not intended as a definition of the limits of the invention. Reference for this latter purpose being had primarily to the appended claims.

In the drawings, wherein like reference characters refer to like parts throughout the several views, FIG. 1 is a schematic view of apparatus and process in its preferred form.

Figure 1:
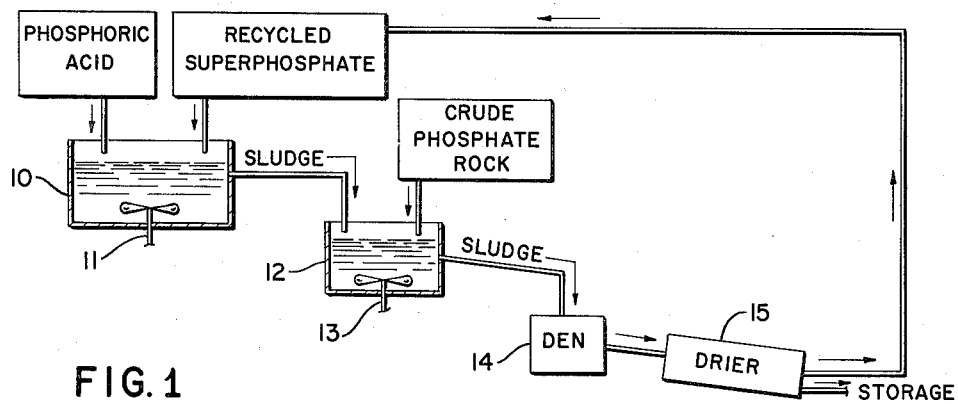

Referring now to the numerals of the drawing, a vat 10 provided with a vertical stirrer 11 receives phosphoric acid and recycled superphosphate, producing a sludge having an increased $P_2O_5$ content which goes by overflow to a vat 12 having an agitator 13 into which crude phosphate rock lumps, as received from the mine, are admitted. The sludge from this reaction goes to a den 14 where it is aged sufficiently and is then discharged to a rotary drier 15 which is supplied with hot drying gases according to systems of drying already in use. The product from the drier is divided into sizes which go to storage and sizes which are recycled to the vast 10.

In the modification a vat 20 receives dilute phosphoric acid, crude phosphate rock, and recycled superphosphate simultaneously. The sludge is discharged to a den 21 for brief aging and then is moved to a drier 22 from whence it is taken and divided as indicated in FIG. 1.

Figure 3:
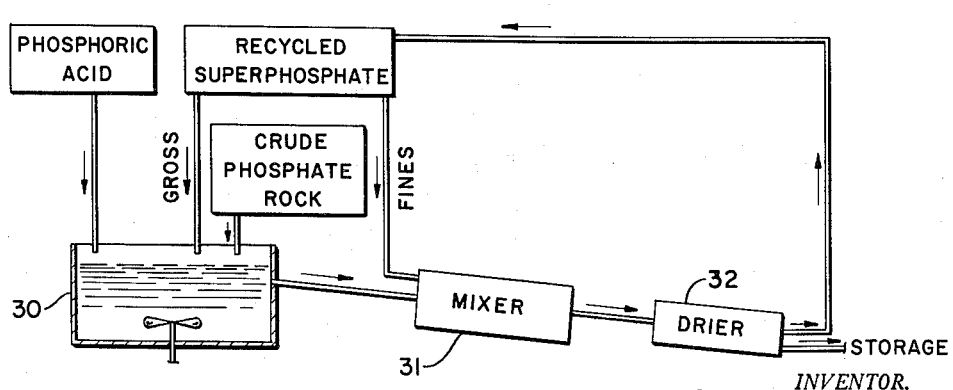
FIG. 3 is a schematic view of yet another modification.

FIG. 3 is another modification of the invention in which a vat 30 receives dilute phosphoric acid, phosphate of fertilizer grade and gross particles of recycled final product. The sludge passes to mixer 31 which also receives the fines from the final product and the drier 32 receives the product directly from the mixer. The product from the drier is divided into three sizes, gross, marketable, and fines of which gross and fines are recycled as aforesaid.

Figure 2:
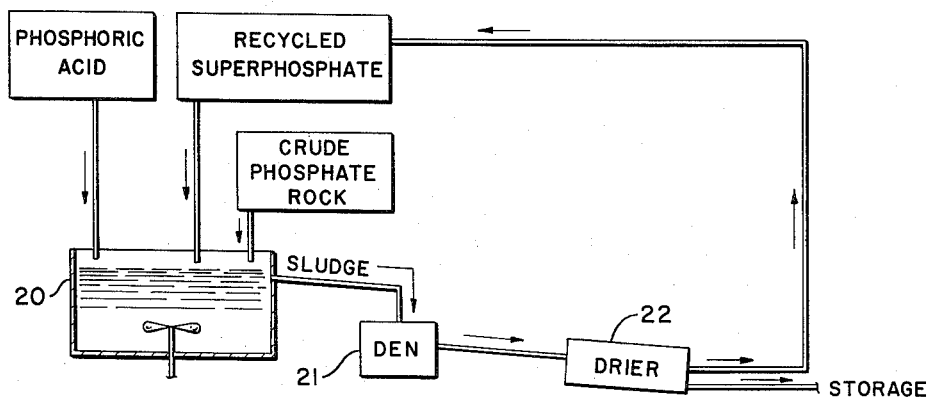
FIG. 2 is a schematic view of an excellent modification.

The apparatus of FIGS. 1 and 2 includes a den of ordinary type used in the manufacture of ordinary superphosphate in which is received the sludge resulting from the attack on the phosphate of fertilizer grade. In that den setting takes place. The cake obtained is then crumbled and admitted to a rotary drier which lowers its humidity at least 10%.

The following examples illustrate the invention without imposing limitations on the generality of what is elsewhere said:

Example 1

Into a vat provided with a vertically acting impeller of 10.3 cu. meters capacity there was introduced 12,070 kgs./hr. of phosphoric acid in the wet way ($P_2O_5$ content 30%) and 20,000 kgs. of dry triple superphosphate which had been recycled from the final product. The sludge obtained passed by overflow to a second vat provided with an agitator and of 5.3 cu. meters capacity, to which there was added 4,160 kgs./hr. of uncrushed Moroccan phosphate ($P_2O_5$ content 33.5%). The mixture from this reaction fell into a superphosphate den of classic type capable of acting continuously or intermittently, where the sludge set.

After about 1 hour in the den, the solid product was crumbled and passed to a rotary drier which reduced its humidity to 6.7%. This produced 30 tons/hr. of dry product of which 10 tons was sent to storage for sale while the other 20 tons were recycled to the first vat, as aforesaid. The fertilizer titrated 50.1% of total $P_2O_5$ of which 49% was assimilable.

Example 2

Using the same process as in Example 1 but a single vat as in FIG. 2, of capacity 12.3 cu. meters there was introduced simultaneously phosphoric acid triple superphosphate recycled from the final product, and uncrushed Moroccan phosphate in lumps in the proportions of Example 1 was admitted downstream of the acid and final product. The rest of the apparatus was unchanged and the same result was obtained as in Example 1.

Example 3

Within the scope of the invention, one may admit the sludge directly to a rotary drier while admixing with it a recycled product and the phosphoric acid. Enough dried product is added to produce a divided product having sufficient surface for drying; because the recycled product is first dissolved in phosphoric acid the sludge obtained is thick and the total quantity of final product recycled is much less than if one uses the fluid sludge obtained by simple mixing of 25–30% acid with the rock. The gross particles of final product dissolve easily in the phosphoric acid. Consequently, when one returns only part of the final product to the phosphoric acid, recycling other parts elsewhere, one can, by appropriate screening, direct the gross particles to that place, without crushing them.

In carrying out this modification of the invention an agitated vat of 20.3 cu. meters capacity received per hour 12,070 kgs. of phosphoric acid (30% $P_2O_5$), 4,160 kgs. of crushed Morrocan phosphate ($P_2O_5$, 33.5%), and 20,000 kgs. of recycled triple superphosphate which had been rejected by a screen have, 4 x 4 mm. openings. The resulting sludge was sent to a mixer or to a rotary drum which also received 35,000 kgs./hr. of recycled triple superphosphate comprising the fines which had passed through a screen having 3 x 3 mm. openings.

The moist product obtained in a divided state went directly to a rotary drier which yielded 65,000 kgs./hr. of dry triple superphosphate which was sent to the 4 x 4 and 3 x 3 screens mentioned above. There were 20,000 kgs./hr. of gross particles recycled to the phosphoric acid vat and 35,000 kgs./hr. mainly fines recycled to the mixer. The remainder were of marketable size and had the following analysis: $P_2O_5$ total 50.1%, $P_2O_5$ assimilable 49.0%, humidity 6.7%.

As many apparently widely different embodiments of the present invention may be made without departing from the spirit and scope thereof, it is to be understood that the invention is not limited to the specific embodiment.

What is claimed is:

1. The method of making triple superphosphate that comprises mixing a stream of phosphoric acid of about 25–30% $P_2O_5$ flowing at a rate of about 12 pts./hr. with a stream of dry triple superphosphate flowing at a rate of about 20 pts./hr. from the final product of the process, mixing the sludge thus obtained with a flow of about 4 pts./hr. of raw phosphate of fertilizer grade, drying and aging the product of reaction, isolating a marketable fraction, and returning a larger fraction comprising coarse and fines to the initial step for mixing with fresh phosphoric acid.

2. The method of making triple superphosphate that comprises mixing a stream of phosphoric acid of about 25–30% $P_2O_5$ with a stream of dry triple superphosphate in proportions which will increase the $P_2O_5$ content resulting from the attack of the acid on raw phosphate of fertilizer grade and which produces a substantially complete solution of the superphosphate, mixing the sludge thus obtained with raw phosphate of fertilizer grade, aging and drying the product of reaction, isolating a marketable fraction, and mixing another fraction with fresh acid.

3. The method of claim 2 in which the product of reaction is aged and dried in a den.

4. The method of claim 2 in which the product of reaction is aged and dried in a rotary drier.

5. The method of claim 2 in which the product of reaction flows to a mixing place, fine particles of dried and aged superphosphate are there mixed with the product or reaction, and the mixture flows to a rotary drier.

References Cited in the file of this patent

UNITED STATES PATENTS

| | | |
|---|---|---|
| 1,790,502 | Hechenbleikner | Jan. 27, 1931 |
| 2,015,384 | Nordengren | Sept. 24, 1935 |
| 2,448,126 | Shoeld | Aug. 31, 1948 |
| 2,598,658 | Procter et al. | May 27, 1952 |
| 2,739,886 | Facer | Mar. 27, 1956 |

UNITED STATES PATENT OFFICE
CERTIFICATE OF CORRECTION

Patent No. 3,025,152　　　　　　　　　　　　　　　　March 13, 1962

Bernard Charles Bigot

It is hereby certified that error appears in the above numbered patent requiring correction and that the said Letters Patent should read as corrected below.

Column 4, line 47, for "or" read -- of --.

Signed and sealed this 24th day of July 1962.

(SEAL)
Attest:

ERNEST W. SWIDER
Attesting Officer

DAVID L. LADD
Commissioner of Patents